United States Patent [19]
Brewer et al.

[11] Patent Number: 5,949,353
[45] Date of Patent: Sep. 7, 1999

[54] WAKE TURBULENCE AVOIDANCE LIGHTS

[76] Inventors: Brian S. Brewer; Julie S. Brewer, both of 4407 20th Ave. W., Bradenton, Fla. 34209

[21] Appl. No.: 09/159,852

[22] Filed: Sep. 24, 1998

[51] Int. Cl.⁶ ........................................... G08G 5/00
[52] U.S. Cl. ................. 340/947; 340/953; 340/948; 340/951; 340/954; 340/959; 340/961
[58] Field of Search ................... 340/953, 947, 340/948, 951, 954, 959, 961

[56] References Cited

U.S. PATENT DOCUMENTS

| | | | |
|---|---|---|---|
| 3,693,015 | 9/1972 | Funk, Jr. | 250/564 |
| 3,701,969 | 10/1972 | Lambert et al. | 340/953 |
| 4,733,833 | 3/1988 | Shepherd | 244/114 R |
| 5,243,340 | 9/1993 | Norman et al. | 340/953 |
| 5,485,151 | 1/1996 | Runyon et al. | 340/953 |
| 5,629,691 | 5/1997 | Jain | 340/961 |

*Primary Examiner*—Benjamin C. Lee

[57] ABSTRACT

A wake turbulence avoidance light system is provided including an aircraft runway with a periphery including a pair of long parallel side edges and a pair of short end edges. Also included is a plurality of light assemblies mounted along at least one of the side edges of the runway in spaced relationship. A plurality of sensors are adapted for indicating a point on the runway at which a plane has departed. Finally, control circuitry is connected between the light assemblies and the sensors for indicating a location of the point by illuminating a light assembly adjacent thereto, as detected by the sensor.

7 Claims, 2 Drawing Sheets

5,949,353

WAKE TURBULENCE AVOIDANCE LIGHTS

BACKGROUND OF THE INVENTION

1. Field of the Invention

The present invention relates to a wake turbulence avoidance light system and more particularly pertains to indicating a safe place for a plane to land and/or depart which is absent any dangerous wake turbulence.

2. Description of the Prior Art

The use of runway lights is known in the prior art. More specifically, runway lights heretofore devised and utilized for the purpose of identifying a runway are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 3,693,015; U.S. Pat. No. 3,618,002; U.S. Pat. No. 3,868,778; U.S. Pat. No. 4,456,383; U.S. Pat. No. 3,972,125 and International Patents WO 86/04437 and EP 0 312 483 A2.

In this respect, the wake turbulence avoidance light system according to the present invention substantially departs from the conventional concepts and designs of the prior art, and in so doing provides an apparatus primarily developed for the purpose of indicating a safe place for a plane to land and/or depart which is absent any dangerous wake turbulence.

Therefore, it can be appreciated that there exists a continuing need for a new and improved wake turbulence avoidance light system which can be used for indicating a safe place for a plane to land and/or depart which is absent any dangerous wake turbulence. In this regard, the present invention substantially fulfills this need.

SUMMARY OF THE INVENTION

In view of the foregoing disadvantages inherent in the known types of runway lights now present in the prior art, the present invention provides an improved wake turbulence avoidance light system. As such, the general purpose of the present invention, which will be described subsequently in greater detail, is to provide a new and improved wake turbulence avoidance light system which has all the advantages of the prior art and none of the disadvantages.

To attain this, the present invention is adapted for use with an aircraft runway with a periphery including a pair of long parallel side edges and a pair of short end edges. The present invention includes a plurality of light assemblies mounted along the side edges of the runway in equally spaced relationship along an entire length thereof. Each light assembly includes a vertically oriented post, a dome-shaped transparent housing mounted on a top end of the post, and a lamp mounted within the housing. The light assemblies are grouped into laterally aligned pairs each adapted to illuminate upon the receipt of power. The housings of the light assemblies of a first side edge of the runway are visible only from a first end edge of the runway. Further, the pairs of light assemblies of a second side edge of the runway are visible only from a second end edge of the runway. As shown in FIGS. 1 & 4, a plurality of motion sensing strips each extend laterally between the side edges of the runway between an associated pair of the light assemblies. In use, each motion sensing strip serves to deploy an activation signal upon the same being depressed by a wheel of an aircraft. Finally, control circuitry is connected between each pair of the light assemblies and the associated motion sensing strips The control circuitry is adapted to illuminate each pair of light assemblies upon the receipt of the activation signal from the associated motion sensing strip. Further upon the receipt of the activation signal, the control circuitry deactivates the remaining light assemblies not associated with the motion sensing strip that is depressed. The control circuitry further includes a reset switch for deactivating all of the light assemblies upon the manual closing thereof. Further, a plurality of set switches are each adapted for illuminating an associated one of the pairs of light assemblies upon the manual closing thereof.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, many readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wake turbulence avoidance light system which has all the advantages of the prior art runway lights and none of the disadvantages.

It is another object of the present invention to provide a new and improved wake turbulence avoidance light system which may be easily and efficiently manufactured and marketed.

It is a further object of the present invention to provide a new and improved wake turbulence avoidance light system which is of a durable and reliable construction.

An even further object of the present invention is to provide a new and improved wake turbulence avoidances light system which is susceptible of a low cost of manufacture with regard to both materials and labor, and which accordingly is then susceptible of low prices of sale to the consuming public, thereby making such wake turbulence avoidance light system economically available to the buying public.

Still yet another object of the present invention is to provide a new and improved wake turbulence avoidance light system which provides in the apparatuses and methods of the prior art some of the advantages thereof, while simultaneously overcoming some of the disadvantages normally associated therewith.

Still another object of the present invention is to indicate a safe place for a plane to land which is absent any dangerous wake turbulence.

Lastly, it is an object of the present invention to provide a new and improved wake turbulence avoidance light system including an aircraft runway with a periphery having a pair of long parallel side edges and a pair of short end edges. Also included is a plurality of light assemblies mounted along at least one of the side edges of the runway in spaced relationship. A plurality of sensors are adapted for indicating a point on the runway at which a plane has departed. Finally, control circuitry is connected between the light assemblies and the sensors for indicating a location of the point by illuminating a light assembly adjacent thereto, as detected by the sensor.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
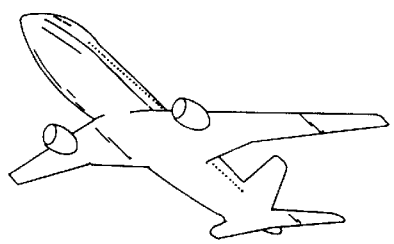
FIG. 1 is a perspective illustration of the preferred embodiment of the wake turbulence avoidance light system constructed in accordance with the principles of the present invention.
Figure 2:
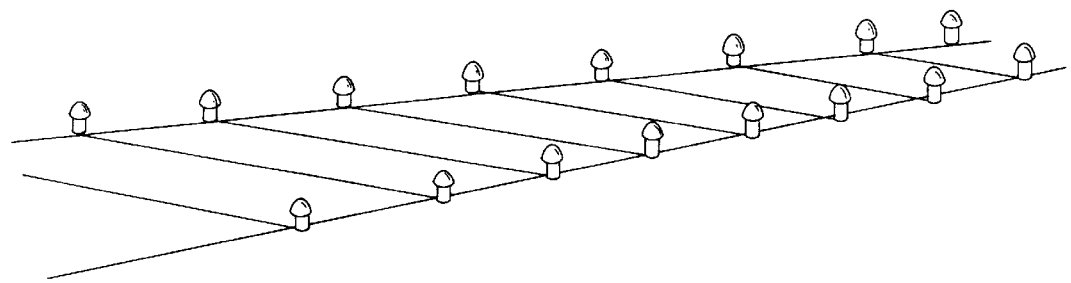
FIG. 2 is a close-up perspective view of one of the light assemblies of the present invention.
Figure 2:
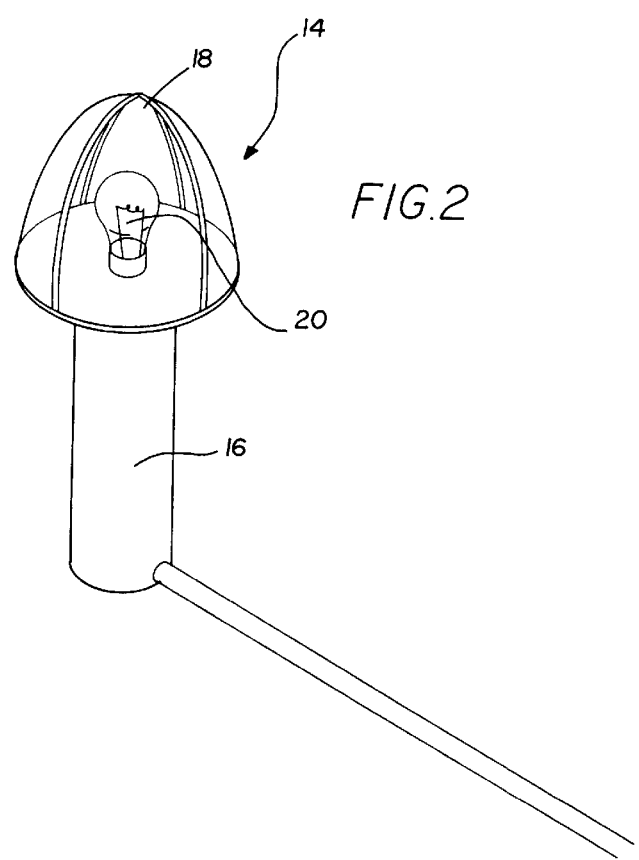
Figure 3:
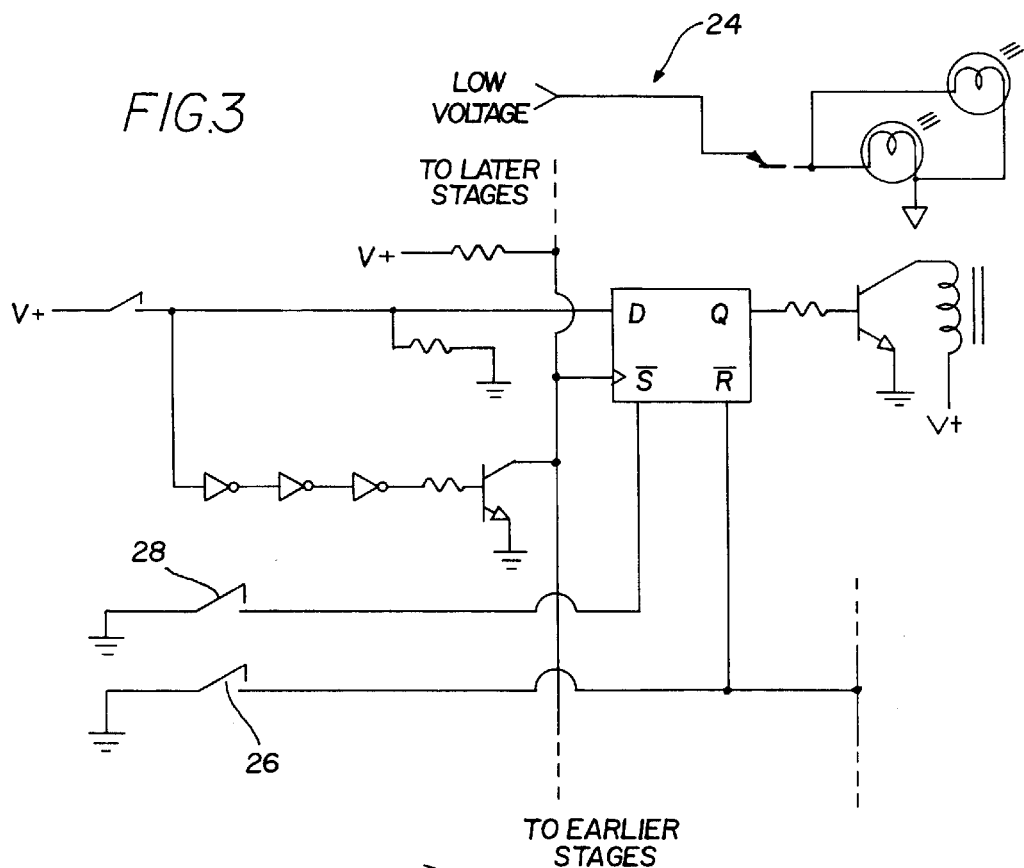
FIG. 3 is a schematic diagram of the present invention.

With reference now to the drawings, and in particular to FIG. 1 thereof, a new and improved wake turbulence avoidance light system embodying the principles and concepts of the present invention and generally designated by the reference numeral 10 will be described.

The present invention, the new and improved wake turbulence avoidance light system, is comprised of a plurality of components. Such components in their broadest context include lamp assemblies, motion sensing strips and control circuitry. Such components are individually configured and correlated with respect to each other so as to attain the desired objective.

The system 10 of the present invention is adapted for use with an aircraft runway 12 with a periphery including a pair of long parallel side edges and a pair of short end edges. The present invention includes a plurality of light assemblies 14 mounted along the side edges of the runway in an equally spaced relationship along an entire length thereof. Each light assembly includes a vertically oriented post 16, a dome-shaped transparent housing 18 mounted on a top end of the post, and a lamp 20 mounted within the housing.

The light assemblies are grouped into laterally aligned pairs 22 each adapted to illuminate upon the receipt of power. Ideally, the lamps are of a unique color or strobed in order to differentiate the same from conventional runway lights. The housings of the light assemblies of a first side edge of the runway are visible only from a first end edge of the runway. Further, the pairs of light assemblies of a second side edge of the runway are visible only from a second end edge of the runway. To accomplish this, one side of the housing is opaque. As such, the light assemblies to the right of an arriving or departing are visible to a pilot. Ideally, the housing is further configured such that the lamp is visible only between 10 degrees above and below the normal glide slope (for arriving planes).

Figure 4:
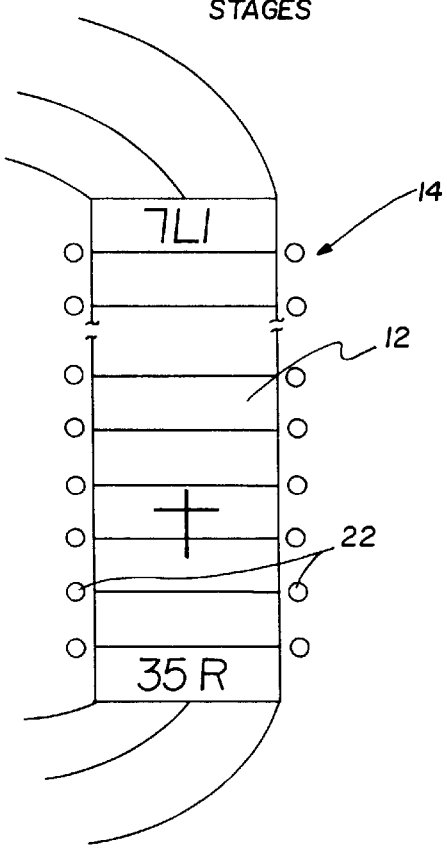
FIG. 4 is a top view of the present invention.

As shown in FIGS. 1 & 4, a plurality of motion sensing strips 22 each extend laterally between the side edges of the runway between an associated pair of the light assemblies. In use, each motion sensing strip serves to deploy an activation signal upon the same being depressed by a wheel of an aircraft.

Finally, control circuitry 24 is connected between each pair of the light assemblies and the associated motion sensing strips. The control circuitry is adapted to illuminate each pair of light assemblies upon the receipt of the activation signal from the associated motion sensing strip. Further upon the receipt of the activation signal, the control circuitry deactivates the remaining light assemblies not associated with the motion sensing strip that is depressed.

The control circuitry further includes a reset switch 26 for deactivating all of the light assemblies upon the manual closing thereof. Further, a plurality of set switches 28 are each adapted for illuminating an associated one of the pairs of light assemblies upon the manual closing thereof. The buttons thus allow the present invention to be controlled manually from a control tower if desired.

To accomplish its associated function, the control circuitry may include a plurality of D-flip flops each with an input connected to an associated motion sensing strip. Further, an asychronous delay and open collector driver may be connected between an enable of the flip flop and associated motion sensing strip to effect the deactivation of the light assemblies, as set forth hereinabove. Relays may be employed to drive the lamps.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A wake turbulence avoidance light system comprising:
    an aircraft runway with a periphery including a pair of long parallel side edges and a pair of short end edges;
    a plurality of light assemblies mounted along at least one of the side edges of the runway in spaced relationship;
    a plurality of sensors for indicating a point on the runway at which a plane has departed; and control circuitry connected between the light assemblies and the sensors for indicating a location of the point by illuminating one of the light assemblies adjacent thereto, as detected by the sensor.

2. A wake turbulence avoidance light system as set forth in claim 1 wherein the sensor is a motion sensor.

3. A wake turbulence avoidance light system as set forth in claim 1 wherein the motion sensor is triggered upon the aircraft rolling over the same.

4. A wake turbulence avoidance light system as set forth in claim 1 wherein the lights are situated on both sides of the runway and are visible only from one end edge of the runway.

5. A wake turbulence avoidance light system as set forth in claim 1 wherein the control circuitry includes a reset switch for deactivating all of the light assemblies upon the manual closing thereof.

6. A wake turbulence avoidance light system as set forth in claim 1 wherein the control circuitry includes a plurality of set switches each adapted for illuminating at least one associated light assemblies upon the manual closing thereof.

7. A new and improved wake turbulence avoidance light system comprising:

an aircraft runway with a periphery including a pair of long parallel side edges and a pair of short end edges;

a plurality of light assemblies mounted along the side edges of the runway in equally spaced relationship along an entire length thereof, each light assembly including a vertically oriented post, a dome-shaped transparent housing mounted on a top end of the post, and a lamp mounted within the housing, the light assemblies grouped into laterally aligned pairs each adapted to illuminate upon the receipt of power, wherein the housings of the light assemblies of a first side edge of the runway are visible only from a first end edge of the runway and those of a second side edge of the runway are visible only from a second end edge of the runway;

a plurality of motion sensing strips each extending laterally between the side edges of the runway between an associated pair of the light assemblies, each motion sensing strip adapted to deploy an activation signal upon the same being depressed by a wheel of an aircraft; and control circuitry connected between each pair of the light assemblies and the associated motion sensing strips, the control circuitry adapted to illuminate each pair of light assemblies from the associated motion sensing strip and further deactivate the remaining light assemblies upon the receipt of the activation signal, the control circuitry further including a reset switch for deactivating all of the light assemblies upon the manual closing thereof and further a plurality of set switches each adapted for illuminating an associated one of the pairs of light assemblies upon the manual closing thereof.

* * * * *